(12) United States Patent
Bognar et al.

(10) Patent No.: US 10,579,138 B2
(45) Date of Patent: Mar. 3, 2020

(54) HEAD-MOUNTED SENSOR SYSTEM

(71) Applicant: RESCAN, INC., Redwood City, CA (US)

(72) Inventors: Botond Bognar, Budapest (HU); Robert Herman, San Carlos, CA (US)

(73) Assignee: RESCAN, INC., Redwood City, CA (US)

( * ) Notice: Subject to any disclaimer, the term of this patent is extended or adjusted under 35 U.S.C. 154(b) by 0 days.

(21) Appl. No.: 15/388,935

(22) Filed: Dec. 22, 2016

(65) Prior Publication Data

US 2018/0181195 A1 Jun. 28, 2018

(51) Int. Cl.
| | |
|---|---|
| *G06F 3/01* | (2006.01) |
| *G06T 15/04* | (2011.01) |
| *G01S 17/08* | (2006.01) |
| *G06T 17/20* | (2006.01) |
| *G06T 19/00* | (2011.01) |
| *G01S 15/08* | (2006.01) |
| *G01S 17/89* | (2020.01) |
| *G01S 15/02* | (2006.01) |
| *G01S 17/02* | (2020.01) |
| *G01S 15/89* | (2006.01) |
| *G06F 1/16* | (2006.01) |
| *A42B 1/24* | (2006.01) |

(52) U.S. Cl.
CPC ............ *G06F 3/012* (2013.01); *G01S 15/025* (2013.01); *G01S 15/08* (2013.01); *G01S 15/89* (2013.01); *G01S 17/023* (2013.01); *G01S 17/08* (2013.01); *G01S 17/89* (2013.01); *G06F 1/163* (2013.01); *G06F 3/011* (2013.01); *G06T 15/04* (2013.01); *G06T 17/20* (2013.01); *G06T 19/003* (2013.01); *A42B 1/242* (2013.01)

(58) Field of Classification Search
CPC .......... G06F 3/012; G01S 15/08; G01S 17/08; G06T 15/04; G06T 17/20; G06T 19/003; G06T 2215/12; G06T 2215/16
USPC .............................................................. 345/8
See application file for complete search history.

(56) References Cited

U.S. PATENT DOCUMENTS

| | | |
|---|---|---|
| 8,838,381 B1 | 9/2014 | Daily et al. |
| 9,411,419 B2 | 8/2016 | Kasahara et al. |
| 2005/0046645 A1 | 3/2005 | Breton et al. |

(Continued)

FOREIGN PATENT DOCUMENTS

| | | |
|---|---|---|
| KR | 101656873 B1 | 9/2016 |
| WO | 2016/001416 A1 | 1/2016 |

OTHER PUBLICATIONS

Baglietto, et al., "Human Navigation and Mapping with a 6DOF IMU and a Laser Scanner", Robotics and Autonomous Systems, Apr. 6, 2012, 20 pages.

(Continued)

*Primary Examiner* — Stephen G Sherman
(74) *Attorney, Agent, or Firm* — Royse Law Frim, PC

(57) ABSTRACT

Systems and method of mapping spaces include a head-mounted sensor array. The array includes sensors configured to both measure distances within spaces and capture images of the spaces. This data may be used to generate continuously navigable virtual simulations of the spaces. Mapping of the spaces may include movable objects such as doors, transparent objects such as windows, and transitions between floors.

22 Claims, 4 Drawing Sheets

(56) References Cited

U.S. PATENT DOCUMENTS

| | | | |
|---|---|---|---|
| 2012/0075168 A1* | 3/2012 | Osterhout | G02B 27/017 345/8 |
| 2012/0206452 A1 | 8/2012 | Geisner et al. | |
| 2013/0206741 A1* | 8/2013 | Pfeifer | B23K 9/095 219/130.01 |
| 2013/0222369 A1 | 8/2013 | Huston et al. | |
| 2013/0305437 A1* | 11/2013 | Weller | A42B 3/0406 2/422 |
| 2014/0145914 A1* | 5/2014 | Latta | G06F 1/3215 345/8 |
| 2014/0266988 A1* | 9/2014 | Fisher | G02B 27/017 345/8 |
| 2014/0268098 A1 | 9/2014 | Schwarz et al. | |
| 2015/0269785 A1 | 9/2015 | Bell et al. | |
| 2016/0116593 A1 | 4/2016 | Kim et al. | |
| 2016/0191796 A1 | 6/2016 | Mate et al. | |
| 2016/0210785 A1 | 7/2016 | Balachandreswaran et al. | |
| 2016/0261300 A1 | 9/2016 | Fei et al. | |
| 2016/0313445 A1 | 10/2016 | Bailey et al. | |
| 2017/0174344 A1 | 6/2017 | Lema et al. | |
| 2017/0220119 A1 | 8/2017 | Potts et al. | |
| 2018/0284256 A1* | 10/2018 | Sutou | G01C 3/06 |

OTHER PUBLICATIONS

Agarwal, Sameer, et al. "Building rome in a day." Communications of the ACM 54.10 (2011): 105-112.

Koutsoudis, Anestis, et al. "3DSSE-A 3D scene search engine: exploring 3D scenes using keywords." Journal of Cultural Heritage 13.2 (2012): 187-194.

Smith, Joanna S., et al. "Modeling the Past Online: Interactive Visualisation of Uncertainty and Phasing." Euro-Mediterranean Conference. Springer, Cham, 2014.

Snavely, Noah, Steven M. Seitz, and Richard Szeliski. "Modeling the world from internet photo collections." International Journal of Computer Vision 80.2 (2008): 189-210.

Du et al., "Interactive 3D Modeling of Indoor Environments with a Consumer Depth Camera", Proceedings of the 13th International Conference on Ubiquitous Computing, ACM, 2011, pp. 75-84.

Pan et al., "Interactive Model Reconstruction with User Guidance", Mixed and Augmented Reality, 2009, ISMAR 2009, 8th IEEE International Symposium on IEEE, 2009, pp. 209-210.

U.S. Appl. No. 15/389,059, Non-final Office Action dated Sep. 8, 2017.

U.S. Appl. No. 15/389,059, Final Rejection dated Nov. 30, 2017.

U.S. Appl. No. 15/389,059, Advisory Action dated Feb. 14, 2018.

U.S. Appl. No. 15/389,059, Amendment A filed Oct. 4, 2017.

U.S. Appl. No. 15/389,059, Amendment B filed Jan. 29, 2018.

U.S. Appl. No. 15/389,059, Amendment C filed Mar. 30, 2018.

U.S. Appl. No. 15/389,059, Non-final Office Action dated Apr. 30, 2018.

PCT/US2017/068205, International Search Report and written Opinion, dated Apr. 24, 2018.

* cited by examiner

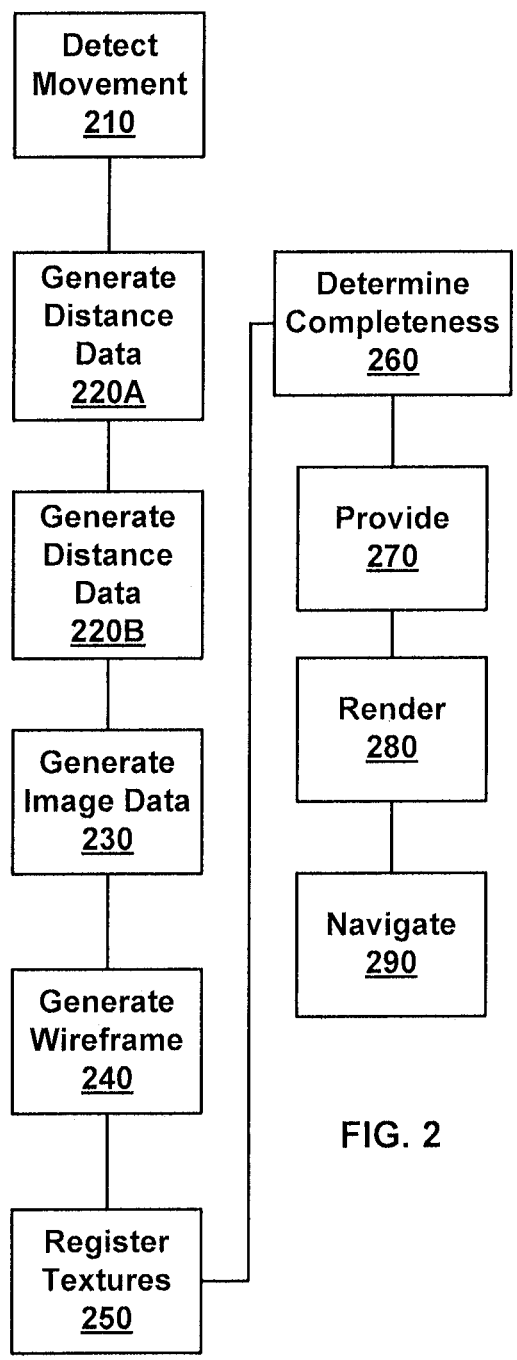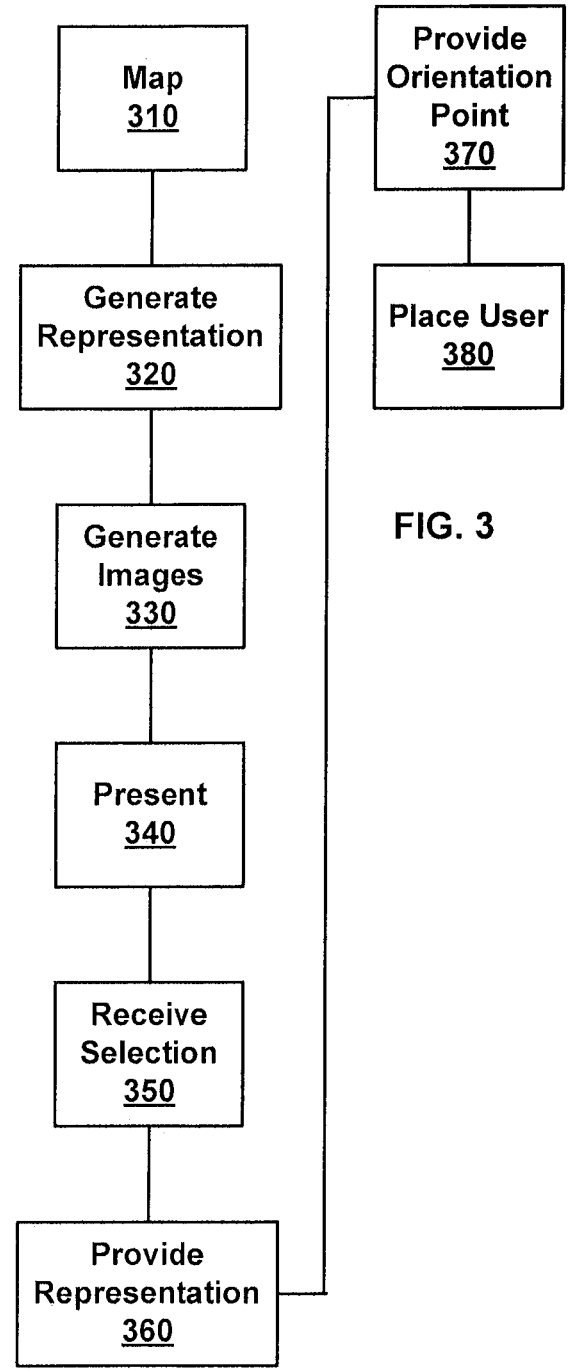
FIG. 2
FIG. 3

HEAD-MOUNTED SENSOR SYSTEM

BACKGROUND

Field of the Invention

The invention is in the field of wearable detection systems, for example, wearable detection systems configured for mapping surfaces.

Related Art

Techniques such as LIDAR (Light Detection and Ranging), ultrasonic range finding and optical rangefinders can be used to find distances between objects.

SUMMARY

The technology disclosed herein relates to the mapping of physical structures and subsequent rendering of these structures into a virtual environment. The mapping is accomplished using a wearable, e.g., head-mounted sensor system that includes a variety of different sensors. The sensor system is optionally partially embodied in a hat or helmet. The different sensors can include any combination of laser (e.g. LIDAR), optical, and/or sonic sensors.

The surfaces detected using the head-mounted sensor system are optionally used to generate a three dimensional wireframe representing a structure or space therein. The head-mounted sensor system also includes a camera configured to image textures. These textures are configured for registration to surfaces of the wireframe. "Registration" includes the positioning of a surface texture on a part of the wireframe. The appearance of textures is optionally dependent on an angle at which they are viewed in a virtual environment.

The disclosed systems optionally include a viewer configured to allow a user to navigate within the virtual environment. Because the virtual environment is generated from textures and wireframe, the user can navigate continuously within the virtual environment, rather than being confined to navigate between a limited number of predesignated points.

Various embodiments of the invention include a head-mounted sensor system comprising: a helmet (optionally configured to protect a head of a person); a first sensor mounted on the helmet, the first sensor being configured to detect distances between the first sensor and surfaces around the helmet using a laser; a second sensor mounted on the helmet, the second sensor being configured to detect distances between the second sensor and the surfaces; a synchronization circuit configured to synchronize outputs of the first sensor and the second sensor; movement sensors configured to detect movement of the helmet; and an output configured to provide output of the first sensor, output of the second sensor and output of the movement sensor, in real-time to a data storage device.

Various embodiments of the invention include a head-mounted transparent surface detection system comprising: a helmet; a first sensor mounted on the helmet, the first sensor being configured to detect distances between the first sensor and surfaces around the helmet using a laser; a second sensor mounted on the helmet, the second sensor being configured to detect distances between the second sensor and the surfaces using sound; a synchronization circuit configured to synchronize outputs of the first sensor and the second sensor; movement sensors configured to detect movement of the helmet; difference logic configured to identify transparent surfaces detected using the sound but not detected using the laser; and an output configured to provide output of the first sensor, output of the second sensor and output of the movement sensor, in real-time to a data storage device.

Various embodiments of the invention include a head-mounted threshold detection system comprising: a helmet; a first sensor mounted on the helmet, the first sensor being configured to detect distances between the first sensor and surfaces around the helmet using a laser; a second sensor mounted on the helmet, the second sensor being configured to detect distances between the second sensor and the surfaces; a synchronization circuit configured to synchronize outputs of the first sensor and the second sensor; movement sensors configured to detect movement of the helmet; edge detection logic configured to identify edges that outline a threshold; and an output configured to provide output of the first sensor, output of the second sensor and output of the movement sensor, in real-time to a data storage device.

Various embodiments of the invention include a method of generating a virtual environment, the method comprising: detecting movement of at least a first sensor, a second sensor and a third sensor through a space, outputs of the first, second and third sensors being synchronized; generating distance data characterizing the space using the first sensor; generating distance data characterizing the space using the second sensor; generating image data characterizing the space using the third sensor; generating a wireframe representative of the space based on the distance data generated using the first and second sensor; registering textures to the wireframe, the textures being based on the image data; and optionally rendering a virtual environment based on the wireframe and the textures.

Various embodiments of the invention include a method of navigating a space, the method comprising: navigating the space to generate image data and to generate distance data, the generated data being representative of the space; generating a virtual representation of the space based on the generated image data and the generated distance data, the virtual representation including a wireframe of the space and a set of textures; generating a set of still images of the space; presenting the set of still images to a remote computing device; receiving a selection of one of the still images from the remote computing device; providing the virtual representation of the space to the remote computing device; providing an orientation point within the virtual representation of the space to the remote computing device, the orientation point being selected based on a viewpoint of the selected one of the still images.

Various embodiments of the invention include a head-mounted sensor system comprising: a head-mounted support covering; an array of distance sensors, each distance sensor configured to detect distances between the support and surfaces (e.g., walls, floor and ceilings) near the support using a laser; an array of image sensors, each image sensor configured to capture images of the surfaces near the head-mounted support using a camera; a synchronization circuit configured to synchronize outputs of the array of distance sensors and the array of image sensors; a movement sensor configured to detect movement of the support; and an output configured to provide output of array of distance sensors, output of the array of image sensors and output of the movement sensor, in real-time to a data storage device.

Various embodiments of the invention include a head-mounted sensor system comprising: a head-mounted support covering; an array of distance sensors, each distance sensor configured to detect distances between the support and surfaces near the support using a laser; a 360 degree camera configured to capture images of the surfaces near the head-mounted support; a synchronization circuit configured to synchronize outputs of the array of distance sensors and the 360 degree camera; a movement sensor configured to detect movement of the support; and an output configured to provide output of array of distance sensors, output of the 360 degree camera and output of the movement sensor, in real-time to a data storage device.

BRIEF DESCRIPTION OF THE DRAWINGS

FIG. 2 illustrates methods of mapping a space, according to various embodiments of the invention.

FIG. 3 illustrates methods of viewing a virtual space, according to various embodiments of the invention.

DETAILED DESCRIPTION

The meanings of "wireframe" and "texture" as used herein are illustrated by, for example, https://en.wikipedia.org/wiki/Wire-frame_model and https://en.wikipedia.org/wiki/Texture_mapping. A wireframe defines edges and surfaces of a structure within a three-dimensional volume, while a texture defines the appearance of the surfaces. A wireframe and set of textures may be used to generate a virtual representation of a space. In some embodiments, the virtual representation of the space is continuously navigable in the horizontal. A space is "continuously navigable" if a user can move to an arbitrary point within the space, rather than being limited to a relatively small number of predefined points. Continuous navigation provides users with an experience of walking through a space rather than jumping from point to point. In some embodiments, navigation even includes a slight variation in height that simulates walking. In a continuously navigable virtual environment, the number of positions to which a user can navigate is optionally limited by resolution of virtual environment rendering rather than being limited by the number of positions within the actual environment at which images are recorded.

The "head-mounted" sensor system discussed herein is configured to be worn on a person's head. For example the head-mounted sensor system may include a helmet or a hat. The sensor system may further include a backpack, satchel, and/or other carrying device connected to the head-mounded part. In alternative embodiments, the head-mounted sensor system is mounted on the "head" of a robotic device such that the sensor system collects data at approximately the average eye level of an adult human.

Figure 1:
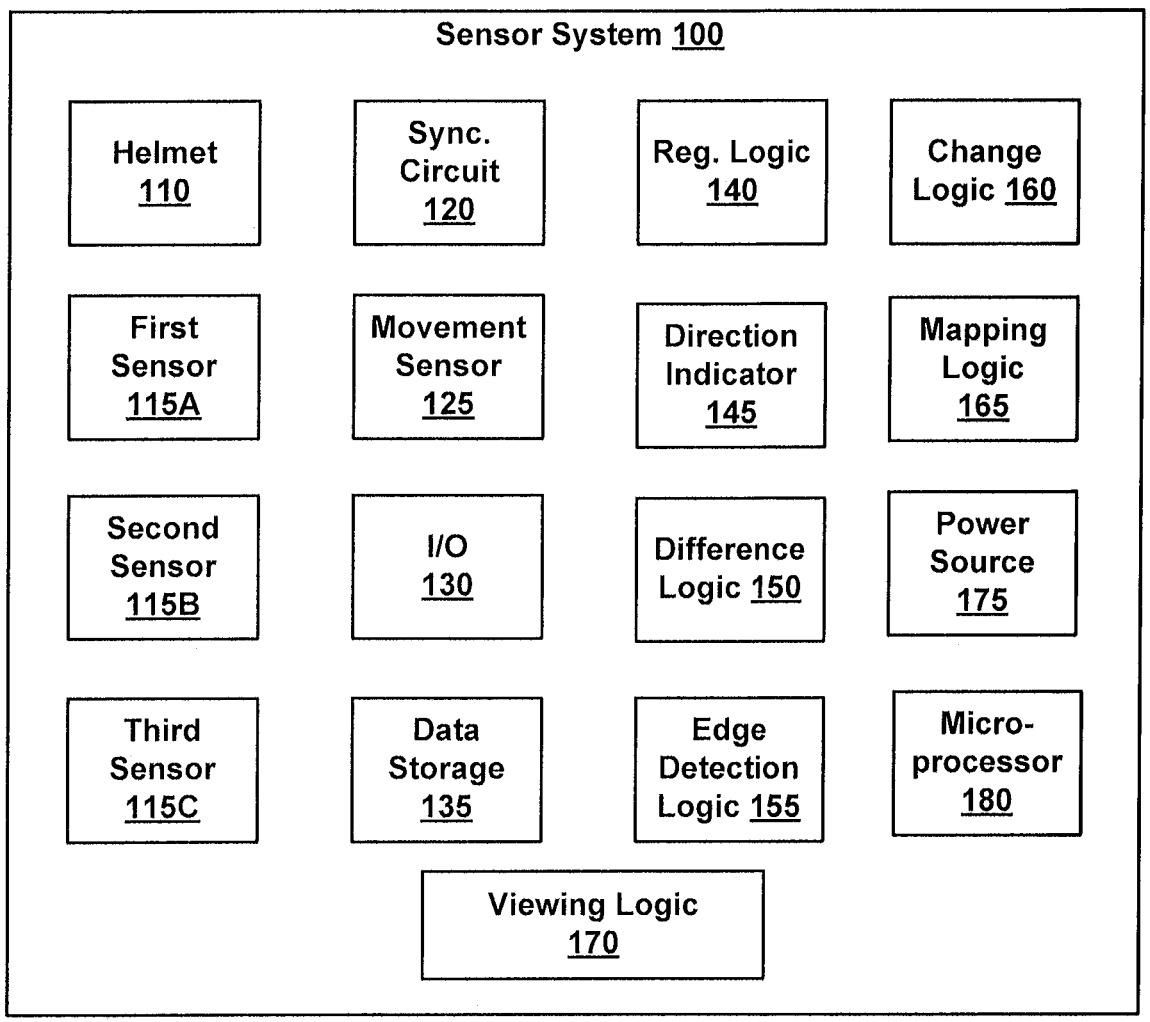
FIG. 1 illustrates a block diagram of a head mounted sensor system, according to various embodiments of the invention.

FIG. 1 illustrates a block diagram of a head mounted Sensor System 100 according to various embodiments of the invention. Sensor System 100 includes at least a Helmet 110 configured to be worn on the head of a person. Helmet 110 is optionally configured to protect the person. For example, Helmet 110 can be a "hard hat" of plastic or metal, a fabric or leather hat, and/or the like. Helmet 110 may be supported by the person's head.

Sensor System 100 includes at least a First Sensor 115A and a Second Sensor 115B. Sensor System 100 optionally includes additional sensors, e.g. Third Sensor 115C. Sensors 115A, 115B, 115C, etc. are collectively referred to herein as Sensors 115. Sensors 115A, 115B and 115C may each include different types of sensors relative to each other. For example, Sensors 115A, 115B and 115C may include a LIDAR sensor, an optical sensor and an ultrasonic sensor, respectively. Sensors 115A, 115B and 115C are supported by Helmet 110. For example, First Sensor 115A may be disposed on a front of Helmet 110, while Second Sensor 115B is disposed on a back of Helmet 110. First Sensor 115A and/or Second Sensor 115B are configured to detect distances to nearby objects in a 360 degree arch around Helmet 110.

One, two or more of Sensors 115 are optionally disposed above a visor or brim of Helmet 110. As such, when Helmet 110 is worn by a person, Sensors 115 are optionally disposed above the person's eyes or eyebrows. Typically, Helmet 110 is configured not to block a user's forward vision. Further, members of Sensors 115 may be disposed on opposite sides of Helmet 110 such that they generate data by making measurements in different directions.

Each of Sensors 115 optionally includes multiple sensing elements. For example, First Sensor 115A may include two LIDAR devices disposed on opposite sides of Helmet 110. Each of these LIDAR devices is optionally configured to detect distances in a separate 360 degree arc around Helmet 110. Second Sensor 115B may include an optical (coincidence) range finder based on parallax measurement from two cameras. Third Sensor 115C may include a 360 degree camera system configured to capture wide angle images of an environment.

While Sensors 115A, 115B and 115C typically include different types of sensors relative to each other, they can include a wide variety of alternative types of sensors. For example, they can include LIDAR, sonar, radar, ultrasonic, imaging, 3D imaging, temperature, humidity, audio, and/or other types of sensors. Embodiments of the invention include at least two different types of sensors, and may include three, four or more types. Some of the Sensors 115 supported by Helmet 110 are configured to generate data for the identification of surfaces and edges that can be converted to a wireframe representation of an environment. Some of the Sensors 115 supported by Helmet 110 are configured to generate image data that can be converted to textures. In typical embodiments, the geometric relationship between Sensors 115 is well known. For example, a point on a surface mapped by LIDAR can be mapped to a point on an image generated by a camera, because the position of the LIDAR sensor relative to the camera is well known or can be determined based on a series of comparisons between objects detected using each. In some embodiments the expected positions of LIDAR sensors are adjusted in response to measured distances to actual surfaces that fall within their overlapping fields of view.

In a representative embodiment, First Sensor 115A includes a pair of LIDAR sensor elements disposed on opposite sides of Helmet 110. Each of the LIDAR sensor elements are configured to measure distance to surfaces in a 360 degree arc around the respective sensor element. The two LIDAR sensor elements are optionally disposed such their arcs overlap and may be considered separate sensors. Second Sensor 115B includes a 360 degree camera system configured to generate a 360 degree image of surfaces around Helmet 110. The 360 degree camera system may include two or more photo sensors and multiple lenses disposed to capture images from different directions. Third Sensor 115C includes a pair of ultrasonic range finders configured to determine distances to surfaces on two opposing sides of Helmet 110 using sound. An optional fourth member of Sensors 115 includes a pair of stereoscopic camera elements configured to generate a 3D image of the environment in front of Helmet 110. A stereoscopic camera may also be used to determine distances. Sensors 115 may be used in various combinations. For example, some embodiments include first and second sensors having LIDAR sensor elements and stereoscopic camera optics and associated camera elements.

First Sensor 115A, Second Sensor 115B and/or Third Sensor 113C are typically disposed on Helmet 110 such that these Sensors 115 are above a person's eyes when Helmet 110 is worn by the person. Further, at least one or two of Sensors 115 are optionally disposed to detect objects behind the person wearing Helmet 110.

The outputs of each of the Sensors 115 are synchronized using a Synchronization Circuit 120. Synchronization Circuit 120 is configured to set a time relationship between the recording of data by each sensor. For example, in some embodiments Synchronization Circuit 120 is configured to generate a trigger signal that is used to start a data acquisition event at one or more of Sensors 115. In alternative embodiments, a first of Sensors 115 is configured to generate a timing signal, which in turn is received by Synchronization Circuit 120. The timing signal is then used by Synchronization Circuit 120 to generate further timing signals that are sent to other members of Sensors 115. In some embodiments, two or more of Sensors 115 are configured to acquire data independent of an external timing circuit. In these embodiments, Synchronization Circuit 120 is configured to receive a timing signal from each of the two or more Sensors 115 (the timing signals being indicative of the timing of respective data acquisition events) and to store a time offset between each of the timing signals.

Synchronization Circuit 120 is configured to synchronize output of two, three or more of Sensors 115. As used herein, synchronization means that a timing relationship is established between members of Sensors 115. As used herein, "synchronization" does not require that actions occur at the same time, merely that a known time relationship exists between the data acquisition of the various Sensors 115. Synchronization allows for the spatial matching of data generated by each of Sensors 115.

Sensor System 100 further includes one or more Movement Sensors 125 configured to detect movement of and orientation of Helmet 110. Movement Sensors 125 can include gyroscopes, vibration sensors, tilt sensors, inertial sensors, accelerometers, magnetic sensors, and/or the like. Typically Movement Sensors 125 are capable of detecting the orientation (e.g., roll, pitch and yaw) of Helmet 110, and thus the relative orientation of Sensors 115. Movement Sensor 125 is optionally configured to determine a path traveled by Helmet 110.

Sensor System 100 further includes an I/O 130 configured to provide outputs of First Sensor 115A, Second Sensor 115B and/or Third Sensor 115C to a Data Storage 135. Data Storage 135 may include one or more computer readable medium configured to store data in a non-transient form. In some embodiments I/O 130 includes a physical connector configured to electronically connect with Data Storage 135, wherein Data Storage 135 includes a data stick having RAM, SRAM, DRAM, ROM, an optical storage, an electromagnetic storage (e.g., hard drive), and/or the like. I/O 130 is typically configured to provide the outputs of Sensors 115 to Data Storage 135 in real-time, meaning that the outputs of Sensors 115 are provided as further data is generated by the respective sensor.

In some embodiments, I/O 130 includes multiple data paths, each associated with a different cable or connector. For example, data from First Sensor 115A and Second Sensor 115B may be communicated over separate USB or FireWire connections. In some embodiments, I/O 130 includes a radio frequency signal generator and is configured to wirelessly communicate data generated by Sensors 115 via Bluetooth, Wi-Fi, and/or the like.

I/O 130 is optionally further configured to receive commands for the control of Sensors 115 and other logic of Sensor System 100 discussed herein. Data Storage 135 optionally detachable. For example, Data Storage 135 can include an electronic memory configured to be removed from Sensor System 100 and later attached to a different computing device for processing and/or use.

Sensor System 100 optionally includes Registration Logic 140, configured to generate a wireframe representation surfaces within an environment. The wireframe representation is based on, at least, output of First Sensor 115A. Registration Logic 140 is further configured to map textures to the surfaces of the environment. Specifically, Registration Logic 140 may map textures to specific points of the wireframe representation. The appearance of textures are optionally dependent on an angle from which they are viewed. For example, the view out of a window may be simulated by placing an angle dependent texture on the transparent surface of the window.

The generation of a wireframe representation typically includes mapping of detected surfaces to planes or curves and then identification of sufficient wires of the wireframe to represent these surfaces. Large flat surfaces may be represented by a few wires while highly curved or structured surfaces may require many more wires. Algorithms for converting detected surfaces to a wireframe and registering a texture to the resulting model is known in the art.

In some embodiments, Registration Logic 140 is configured to generate a wireframe from surfaces detected using First Sensor 115A and to map textures generated using Second Sensor 115B or Third Sensor 115C to points on the generated wireframe.

Registration Logic 140 is optionally configured to map variable textures to transparent surfaces, or to map textures to distant surfaces outside of the range of First Sensor 115A. Such transparent surfaces are detected using Difference Logic 150 which is configured to identify transparent surfaces that are detected using a first sensor but are not detected using a second sensor. For example, an ultrasonic sensor will detect a window that will be viewed as empty space by a LIDAR sensor. Difference Logic 150 can be configured to identify a surface detected using sound but not using light as a transparent surface, e.g., a glass window. The texture applied to a transparent surface is dependent on the point of view. Specifically, the view out a window is dependent on the viewpoint of the observer. In some embodiments, Registration Logic 140 is configured to handle variable textures by applying the texture to a distant artificial surface. Different parts of this distant artificial surface are seen through a window from different viewpoints. This approach can be applied to both transparent surfaces and open windows.

Sensor System 100 optionally further includes a Directional Indicator 145. Direction Indicator 145 is disposed on a portion of Helmet 110 visible to the wearer, for example on a visor or a brim of Helmet 110. Direction Indicator 145 includes a display that can be seen by the wearer. The display may include an array of pixels that form a screen or may include merely a pair of LEDs. Directional Indicator 145 is configured to indicate the user (wearer) which direction to travel. For example, two LEDs can be disposed in indicate "go right," "go left" or "go straight." If the mapping of a structure requires that the user make a right turn then an LED on the right may turn on, and if the mapping requires that the user go straight ahead both LEDs may turn on. The directions that a user is to travel is optionally determined by Mapping Logic 165 discussed further elsewhere herein.

Sensor System 100 optionally further includes Edge Detection Logic 155 configured to identify edges and/or objects that outline a threshold. Thresholds include windows, doors, stairways, ledges, etc. These structures are often outlined by a molding, recess, and/or the like. Thresholds may be opaque or transparent. Edge Detection Logic 155 may also be configured to detect edges of glass surfaces, hinges/doorknobs, door or window outlines, and/or the like. The detection of objects such as hinges and doorknobs is optionally based on a trained image recognition algorithm. Thresholds identified by Edge Detection Logic 155 are optionally classified as windows or doors. The presence of a door may be used by Mapping Logic 165 in determining area of an environment to be explored and/or determining passageways between spaces. In some embodiments, Edge Detection Logic 155 is configured to detect ramps, staircases and/or balconies. These are characterized by changes in floor level.

Sensor System 100 optionally further includes Change Logic 160 configured to detect changes in an environment. These changes can be with regard to either textures or surfaces. Detected changes can be relative to a current mapping of the environment and/or relative to prior mappings. For example, Change Logic 160 may detect the movement of a door in real time in the output of First Sensor 115A. This detection is optionally preceded by identification of the door using Edge Detection Logic 155. The detected movement may be used to map the direction to which the door opens. In another example, Change Logic 160 may be configured to detect movement of furniture, progress in construction, and/or changes in textures. Specifically, Change Logic 160 may be configured to detect a new mark on a wall or other damage. Change Logic 160 detects changes by comparing raw sensor data and/or by comparing models of the environment (e.g., wireframes and mapped textures).

Sensor System 100 optionally further includes Mapping Logic 165. Mapping Logic 165 is configured to generate a map of an environment based on outputs of at least the first and second sensor. The map including indications of detected surfaces and indication of areas of the environment that have not been mapped, e.g. may include unmapped surfaces. As such, the map may evolve in real-time as a user traverses through the environment. The map may or may not be visible to the user. For example, in some embodiments the map is communicated to a display screen (e.g., Direction Indicator 145, a smartphone or tablet) of the user. The map may be used as a guide through the environment by the user. Alternatively, Mapping Logic 165 can be configured to automatically activate Direction Indicator 145 so as to direct the user through an environment. In such cases, Mapping Logic 165 tracks which areas of the environment have been mapped and the locations of thresholds (e.g., doors or stairs) that may lead to un-mapped areas. The user is then directed to the un-mapped areas using Direction Indicator 145.

In some embodiments, Mapping Logic 165 is configured to consider a surface un-mapped only if the surface would be visible from a specific height range. The range is referred to herein as the "mapping height range." An environment is considered completely mapped when the positions and textures of all surfaces visible from the height range have been characterized. The height mapping range may vary for specific implementations, but can include for example: 4'-6'6", 5'-6'4", 5'2-6'3", or any range between these heights. The mapping height range can cover (min to max) a distance up to 2", 4", 8", 1' 2' or 2'6". The mapping height range can cover a distance of at least 0", 2" 4" or 6", or any range between these minima and maxima. For example, in some embodiments the height range covers a distance between 0" and 2'. In some embodiments, the height range covers between 4" and 2'6". The use of a mapping height range simplifies the modeling of an environment. For example, the underside of a table in a room may never be visible from the mapping height range. In this case, environment may be considered completely mapped even if the table underside has not been detected by any of Sensors 115.

The mapping height ranges are selected to allow for the body heights of various users of Sensor System 100. For example, an environment may be mapped by a 5' tall user wearing Helmet 110 and then later be mapped by a 6' tall user. Further, the mapping height range allows for the natural height variation resulting from a person's walking stride. Helmet 110 changes height as a person walks. Different areas of a space may be mapped using different mapping height ranges. Mapping height ranges, in addition to those specifically discussed herein, may be used in implementations where Sensors 115 are transported on horseback, motorcycle, bicycle, car, robot, drone, aircraft, and or the like.

Sensor System 100 optionally includes Viewing Logic 170 configured to render a virtual environment based on the wireframes and textures generated by Registration Logic 140. Viewing Logic 170 is further configured for a user to navigate within the rendered virtual environment. Because the virtual environment is based on a wireframe and texture model, the user can navigate to and view from positions (within the virtual environment) other than those at which Sensor System 100 navigated. However, view of the virtual environment is typically limited to be from within the mapping height range. Specifically, the data used by Viewing Logic 170 to render the virtual environment includes a viewpoint height from which a viewer sees at any particular point within the virtual environment. The viewpoint height is within the mapping height range and is determined by the height of Sensors 115 during mapping of the corresponding real environment. Viewing Logic 170 is configured to automatically adjust the viewpoint height based on the (changing) height of Sensors 115 during mapping of the environment. For example, if a first room within an environment is mapped (using Helmet 110) by a person that is 5'2" tall and a second room within the environment is mapped (using Helmet 110) by a person that is 6'2", then the height of Helmet 110 (e.g., height Sensors 115) in each of the rooms is included in Data Storage 135 as part of the data characterizing the environment. Typically this height data is stored in association with the wireframe and textures for the environment. Viewing Logic 170 is configured to use this height data to automatically set different mapping height ranges in the first and second room.

If the same room within an environment has been mapped by different users of Helmet 110, then multiple viewpoint heights may be available for the room. Viewing Logic 170 optionally includes controls by which a user can select between the different viewpoint heights.

In some embodiments, the viewpoint height modulates as a function of position within the virtual environment. This modulation can represent the stride of a user of Helmet 110. In such cases the viewpoint modulates slightly up and down as the virtual environment is navigated. This produces a natural walking sensation.

Viewing Logic 170 is optionally disposed on a device external to Sensor System 100. For example, Viewing Logic 170 may be included in a webpage or in a downloadable mobile application. In such cases the height of one or more of Sensors 115 and the wireframes and textures generated by Registration Logic 140 may be accessed on or received via a communication network such as the internet.

Power Source 175 includes an electrical power source configured for providing current to elements of Sensor System 100. For example, Power Source 175 may provide electric power to Sensors 115, Synchronization Circuit 120, and/or Mapping Logic 165. In various embodiments, Power Source 175 includes a battery, capacitor, fuel cell, turbine, generator, solar cell, and/or the like.

Microprocessor 180 includes a digital logic device configured to execute computing instructions, e.g. software or firmware. Microprocessor 180 is configured for executing Registration Logic 140, Difference Logic 150, Edge Detection Logic 155, Change Logic 160, Mapping Logic 165, Viewing Logic 170, and/or the like. Microprocessor 180 is optionally also configured to control communication of data from Sensors 115 to Data Storage 135 and/or to external devices. Microprocessor 180 can include multiple integrated circuits.

Various elements of Sensor System 100 may be disposed in a carrying device separate from Helmet 110. For example, Data Storage 135, Microprocessor 180, Registration Logic 140, Mapping Logic 165, Power Source 175, and/or any other elements of Sensor System 100 may be disposed in a vest, backpack, and/or satchel. Further, in some embodiments, elements of Sensor System 100 may be disposed at a remote location such as a web server. For example, in some embodiments, raw sensor data from Sensors 115 is communicated to a remote server using I/O 130. At the remote server, Registration Logic 140 is used to generate the wireframe representative of the mapped environment. Any elements of Sensor System 100, other than Helmet 100, Sensors 115, Movement Sensor 125, and I/O 130 are optionally disposed remote from Sensor System 100.

In a typical use of Sensor System 100, Helmet 110 is placed on a user's head and the user walks through an environment, such as a building interior, mine, construction site, and/or the like. The various Sensors 115 are used to detect surfaces and surface textures within the environment. Because the Sensors 115A are typically just above eye level, the resulting virtual environment can appear as a complete rendering from eye level, e.g., the mapping height range. This is true even though the virtual environment may appear incomplete at a viewpoint at a height outside the mapping height range. By limiting the viewpoint to the mapping height range, the navigation of the virtual environment is greatly simplified and surfaces not visible to Sensors 115 are not seen in the virtual environment.

FIG. 2 illustrates methods of mapping a space, according to various embodiments of the invention. In this method, Helmet 110 is worn by a person as the person walks through the space. For example, the person may walk through a multi-story office building. During the walk, Sensors 115 are used to generate distance data and image data. The image data is converted to textures and the distance data is used to generate wireframe models of the space. The textures can be registered to the wireframe to create a virtual representation of the space.

More specifically, in a Detect Movement Step 210, Movement Sensor 125 is used to detect movement of Helmet 110 through the space. As Helmet 110 moves so do Sensors 115. The movement can include rotation about any axis as well as translations. Because the spatial relationships between Helmet 110 and Sensors 115 are known the positions of Helmet 110 and of Sensors 115 are also known. During the movement, the outputs of Sensors 115 are synchronized with each other and with the positions. The movement and positions are stored in Data Storage 135.

In Generate Distance Data Steps 220A and 220B, Sensors 115 (e.g., First Sensor 115A and Second Sensor 115B) are used to generate distance data characterizing the space. The distance data represents distances between the respective Sensors 115 and surfaces that surround the space being mapped. For example, the distance data may represent distances between First Sensor 115A and points on walls, a ceiling and a floor. The distance data is optionally stored as an angle around a 360 degree arc in association with a scalar value representative of a distance to a surface at that angle. In various embodiments, the distance measurement is accurate to within 10 mm, 2 mm and 1 mm. The distance data generated using Sensors 115 are synchronized using Synchronization Circuit 120. The distance data are typically further synchronized with the movement detected in Detect Movement Step 210.

In a Generate Image Data Step 230 image data is generated using another of Sensors 115 (e.g. Sensor 115C). The generated image data is stored in Data Storage 135. As described elsewhere herein, the image data optionally includes a spherical image from a 360 degree camera. This image may include the view from the camera in approximately 360 degrees in the horizontal plane and at least 180, 240 or 270 degrees in the vertical plane. Detect Movement Step 210, Generate Distance Data Steps 200A and 220B, and/or Generate Image Data 230 are typically performed contemporaneously. As such, the movement, distance and/or image data may be synchronized.

In a Generate Wireframe Step 240 a wireframe representing the surfaces of the space is generated using Registration Logic 140. The wireframe is optionally generated using the techniques described in U.S. Pat. Nos. 7,187,809 and 7,509, 241. Generate Wireframe Step 240 may be performed in Helmet 110 or on a part of Sensor System 100 that is separate from Helmet 110. The generated wireframe is optionally provided to Difference Logic 150, Mapping Logic 165 and/or Edge Detection Logic 155.

In a Register Textures Step 250 textures for surfaces defined by the wireframe are generated and registered to the wireframe. In some embodiments a texture registered to a surface is generated from multiple video frames or images. These images may be overlaid in a mosaic. The time synchronization between movement, image and distance data is used to identify which images should be applied to which surfaces. Specifically, the synchronization, and time relationships inherent therein, are used to identify parts of images that correspond to specific surfaces whose distance is used to generate the wireframe. Because the spatial relationships between Sensors 115 are known, an image recorded at time "X" can be known to include a surface whose position is represented by distance data recorded at time X (or X').

Where several images of the same area of a surface exist, Registration Logic 140 is optionally configured to select which image to include in a resulting texture. For example, in various embodiments, Registration Logic 140 may be configured to select the image recorded from a point of view most orthogonal to the surface, to select the image recorded with the greatest color variation, to select the image recorded with the greatest variation in pixel intensity, and/or the like. Optionally, several images may be registered to each other and the resulting mosaic then registered to a surface. Alternatively, the images may be each in turn registered to the surface, the registration to the surface being performed by considering the surface and/or images already registered to the surface.

In Register Textures Step 250, Registration Logic 140 is optionally configured to use a combination of images to generate a specific pixel of a texture. For example, where several images cover a same point on a surface, the texture registered to that point may include a pixel based on a mathematical function that includes contribution from the several images, e.g., an average of the contributions.

In an optional Determine Completeness Step 260 the completeness of a map of the space is determined. The completeness is typically regarded as viewed from a mapping height range. As such the mapping of a space is considered complete when all surfaces viewable from the mapping height range have been characterized by image and distance data. The completeness is optionally determined by confirming that distances to all relevant surfaces have been measured and/or images of these surfaces obtained. Determine Completeness Step 260 may or may not require that Register Textures Step 250 has been completed for all of these surfaces. Specifically, in some embodiments, Determine Completeness Step 260 may examine only completeness of a representative wireframe. Completeness is optionally determined by unexplained gaps in the wireframe model of the space.

In some embodiments Determine Completeness Step 260 includes consideration of thresholds identified by Difference Logic 150, Edge Detection Logic 155 and/or Change Logic 160. For example, the detection of a threshold behind a closed door, and/or detection of the opening and closing of a door may require that a space beyond the door be considered in the completeness of a map. In some embodiments, Determine Completeness Step 260 includes use of Direction Indicator 145 to guide a user to incomplete parts of a space so that these spaces can be mapped using Helmet 110 and Sensors 115. Typically, a mapping of a space need not be absolutely complete for the mapping to have desirable use. If a mapping is not complete, Steps 201, 220A, 22B, 230, 240, and/or 250 may be repeated as desired.

As part of Determine Completeness Step 260, the distance data generated in Generate Distance Data Steps 220A and/or 220B are optionally used to correct for drift of Movement Sensor 125. This correction is optionally performed by Mapping Logic 165. For example, if Movement Sensor 125 detects that Helmet 110 has moved 20 cm toward a wall, that movement can be confirmed using a distance measurement of First Sensor 115A. In some embodiments, the distance measurements made by First Sensor 115A are more accurate than the movement measurements of Movement Sensor 125. Thus, if there is a difference between the measurements, those measurements made by First Sensor 115A may be used to adjust that made by Movement Sensor 125. If a user of Helmet 110 completes a loop circuit through a space (returning to a previously traversed point without backtracking), these adjustments may be used to close the loop such that surfaces previously mapped are matched (in space) to the same surfaces on the return to a location. Loops may occur in either the horizontal or vertical. For example, a user of Helmet 110 may take an elevator up one floor and then take a stairway down to the original floor and then return to a previously mapped location. Vertical movement in the elevator may be adjusted using vertical movement on the stairs (where distances may be more accurately measured). Both the elevator and the stairway are optionally used as registration points between the floors.

In an optional Provide Step 270 wireframes and/or textures generated in Generate Wireframe Step 240 and/or Register Textures Step 250 are sent to a device remote from Helmet 110. This destination may include a file server, web server, a personal computer, a tablet computer, and/or the like. In alternative embodiments, raw distance data and/or images are communicated rather than or in addition to wireframes and/or textures. The data may be sent on a computer network, such as the Internet, or on physical storage media.

In an optional Render Step 280 the wireframes and textures generated in Generate Wireframe Step 240 and Register Textures Step 250 are used to render a virtual environment. The rendering is optionally performed using Viewing Logic 170. Rendering of the virtual environment includes placing of textures on proper locations of the wireframe and establishing a viewpoint from which the environment is viewed. The viewpoint is typically restricted to be within the mapping height rage from which distance data and image data are generated in Steps 220A, 220B and 230.

In an optional Navigate Step 290 a user may navigate through the virtual environment generated in Render Step 280. This navigation is optionally performed using Viewing Logic 170. As the user navigates to different locations in a space, their point of view is optionally changed to stay within a variable mapping height range. For example, if a tall person used Helmet 110 to map a first part of the space and a relatively shorter person used Helmet 110 to map a second part of the space, then the viewpoint from which the space is navigated may automatically drop as the user navigates from the virtual simulation of the first part to the virtual simulation of the second part.

In some embodiments, Navigate Step 290 includes the automatic insertion of specific user controls configured to facilitate the navigation of the virtual environment. For example, if opening and/or closing of a door is detected by Change Logic 160, Viewing Logic 170 may be configured to present a control to the viewer (user) that allows them to open and close the door in the virtual simulation of the environment. Likewise, if travel within an elevator is detected during mapping of a space, Viewing Logic 170 may be configured to provide controls to the viewer that allows the user to select destinations for the elevator within the virtual environment. As such, the user can select which of several floors to travel to in the virtual environment representative of the actual mapped space. The controls provided by Viewing Logic 170 are optionally generated automatically based on distance and image data generated during mapping of the environment.

In an illustrative example, Edge Detection Logic 155 may identify a doorknob using image recognition, Change Logic 160 may determine which way the attached door opens, and (in response to these data) Viewing Logic 170 may provide a virtual control that enables a person navigating the virtual representation of the mapped space to open and close a virtual door.

FIG. 3 illustrates methods of viewing a virtual space, according to various embodiments of the invention. One of the distinguishing features of this method is an ability to enter a virtual environment, representative a real-world space, at a large number of positions within the virtual environment. In contrast, simulations of real environments of the prior art typically include images taken using 360 cameras from just a few static positions. Viewing of a virtual environment generated in this way is limited to viewpoints corresponding to the static camera positions. Because various embodiments of the current invention allow generation of a wireframe and associated textures, the virtual environment of the invention can be viewed from a viewpoint that is not restricted by horizontal camera positions. Although, as discussed herein, the viewpoint is optionally limited to being within a virtual mapping height range. In various embodiments, an environment may be view from at least 10, 25, 50 or 100 different horizontal positions within a horizontal square meter of the simulated environment. Further, in the methods illustrated by FIG. 3, still images of an actual space may be used to navigate to positions of choice in a virtual environment representative of the space.

In a Map Step 310, a user transports Sensors 115 through the actual space. The actual space may be a house, multi-story building, mine, construction site, tunnel, warehouse, or any other bounded space. The user may transport Sensors 115 by wearing Helmet 110 on the user's head. During Map Step 310, Detect Movement Step 210, Generate Distance Data Steps 220A & 220B, and Generate Image Data 230 are performed. Direction Indicator 145 is optionally used to guide user to unmapped portions of the actual space, as determined in Determine Completeness Step 260. Map Step 310 results in image and distance data representative of the actual space.

In a Generate Representation Step 320, a virtual representation of the actual space is generated based on the distance and image data generated in Map Step 310. The virtual representation includes, for example, a wireframe and associated textures. These are optionally produces using Generate Wireframe Step 240 and Register Textures Step 250. The generated representation is optionally continuously navigable within horizontal plane or a mapping height range. Generate Representation Step 320 may be performed in real-time contemporaneously with Map Step 310 or at a later time.

In a Generate Images Step 330, a set of still images of the actual space are generated. These still images may be generated from textures of the virtual environment, or from images captured using Third Sensor 115C in Generate Image Data Step 230. The set of still images optionally includes several images of a room. Each of the still images is optionally associated with a different viewpoint and/or direction of view. The viewpoint is the point within the virtual environment from which the respective still image is viewed. Each viewpoint is typically within the mapping height range for the virtual environment and the direction of view is the direction in which the environment is viewed in each, respective, still image. The combination of "viewpoint" and "direction of view" is referred to herein as an "orientation point."

In a Present Step 340, the set of still images are presented to a viewer. The viewer may be a person using a browser or application on a remote device. For example, the viewer may be presented with several images of the actual space in a user interface that allows the user to select one of the images.

In a Receive Selection Step 350, a selection of at least one of the still images is received. The selection is optionally made by a user clicking on the selected still image in a web browser. In a Provide Representation Step 360, all or part of the virtual representation produced in Generate Representation Step 320 is provided the remote device. The virtual representation may be provided as a sequence of rendered images or as a set of wireframes and textures to be rendered on the remote device.

In an optional Provide Orientation Point Step 370, an orientation point is provided to the remote device. The orientation point includes the viewpoint and direction of view associated with the selected still image. Provide Orientation Point Step 370 is optional in embodiments in which the virtual environment is provided to the remote device as a sequence of images (e.g. a video).

In a Place User Step 380, user is placed within the virtual environment at the viewpoint point facing the direction of view. Place User Step 380 optionally includes placement of an avatar at this position and orientation. Following Place User Step 380 the user can view the virtual environment so as to see all or part of the selected image within the virtual environment. The user may then navigate to other locations within the virtual environment using controls of Viewing Logic 170

Figure 4A:
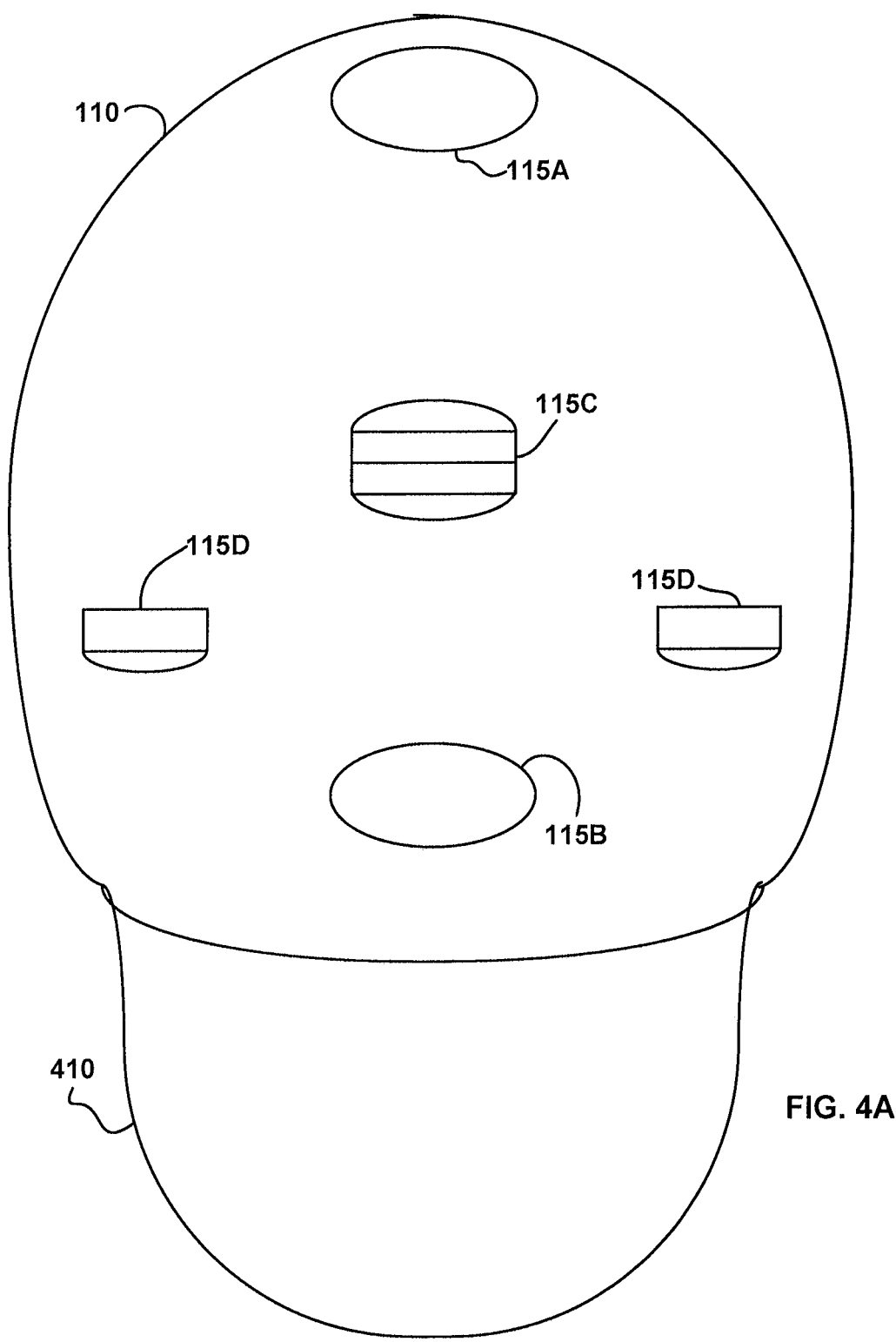
FIGS. 4A and 4B illustrate top and side views of a head mounted sensor system according to various embodiments of the invention.
Figure 4B:
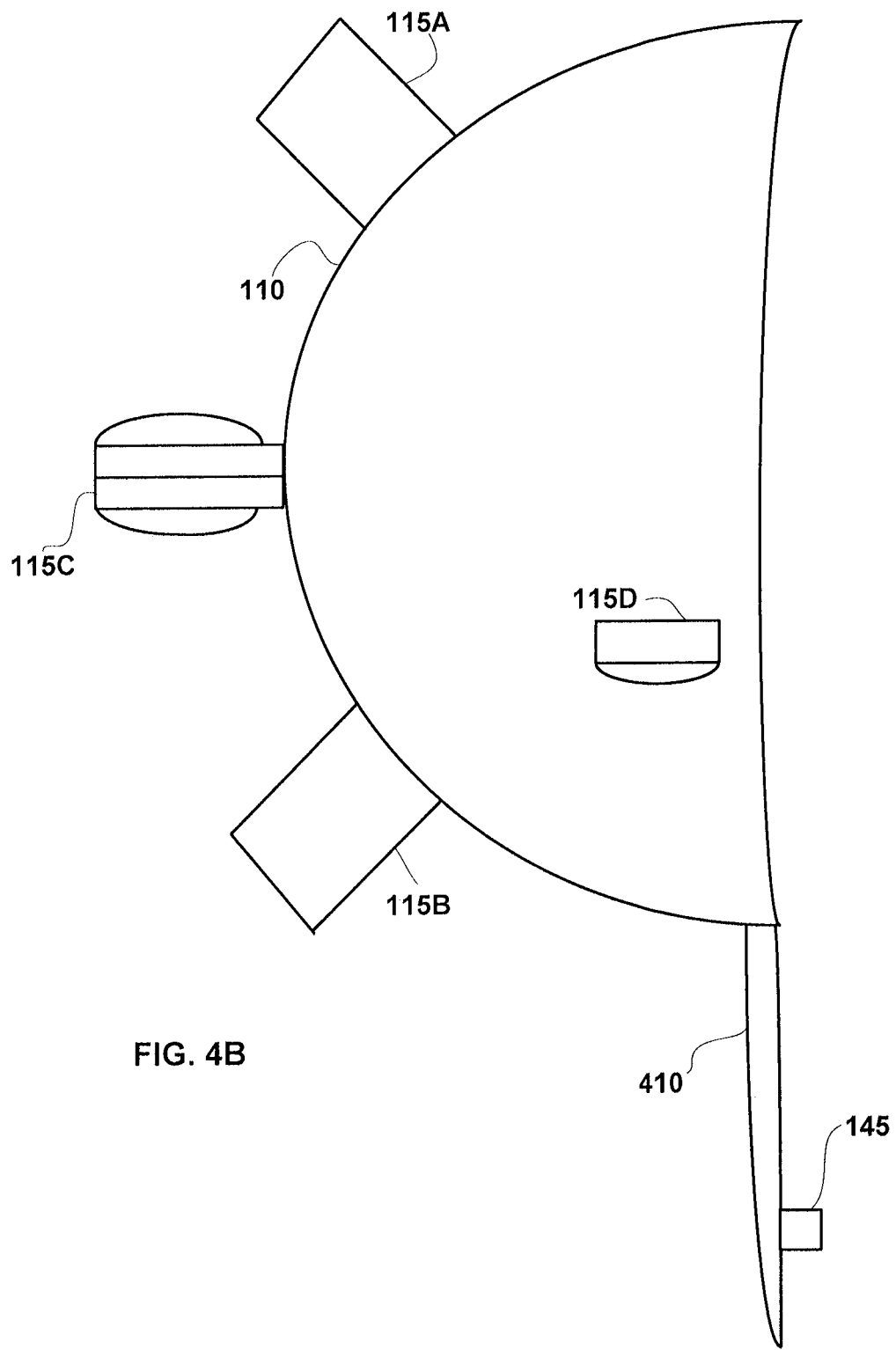

FIGS. 4A and 4B illustrate top and side views of a head mounted sensor system, according to various embodiments of the invention. FIGS. 4A and 4B illustrates an example of Helmet 110 including First Sensor 115A (Back LIDAR), Second Sensor 115B (Front LIDAR), Third Sensor 115C (360 degree camera), and a Fourth Sensor 115D comprising two elements of a stereoscopic camera. The positioning of these Sensors 115 as illustrated are for the purpose of example only. Various embodiments of the invention include head mounted sensors in a wide variety of spatial configurations and combinations of sensor types.

Microprocessor 180 and Data Storage 135 may or may not be attached to the Helmet 110 illustrated in FIGS. 4A and 4B. FIG. 4B further illustrates Direction Indicator 145 mounted below a Visor 410.

As described herein the arrangement and combination of these Sensors 115 may vary widely in type and location, in various embodiments. For example, in some embodiments, Sensors 115 include an array of solid state LIDAR and/or image sensors disposed in a ring around or on top of Helmet 110. In such embodiments, Helmet 110 is optionally replaced by a band or other head (or body)-mounted support that fits around or on a user's head. The array of solid state LIDAR sensors optionally includes overlapping fields of detection. Various embodiments include at least 4, 8, 16 or 32 solid state LIDAR sensors. The array of solid state LIDAR (distance) sensors is optionally combined with an array of image sensors or a 360 degree camera. Synchronization Circuit 120 is optionally configured to synchronize outputs of all these sensors.

Several embodiments are specifically illustrated and/or described herein. However, it will be appreciated that modifications and variations are covered by the above teachings and within the scope of the appended claims without departing from the spirit and intended scope thereof. For example, Helmet 110 may be carried by a robot and/or may be replaced by a flying drone. Further, the data generated using sensors 115 may be both used to generate a virtual representation of an actual space and also be used to help the robot or drone to navigate the actual space. Additional sensors at different heights may be used to expand the mapped height range, relative to that that can be obtained using just helmet mounted sensors. These additional sensors may be worn elsewhere in a person's body or mounted on a robot. Helmet 110 may be supported by a person's shoulders and/or back, while still being disposed at or above the person's head. The systems and method described herein are optionally used to map and simulate outside spaces.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

The logic discussed herein may include hardware, firmware and/or software stored on a computer readable medium. This logic may be implemented in an electronic device to produce a special purpose computing system.

What is claimed is:

1. A head-mounted sensor system comprising:
   a helmet;
   a first LIDAR sensor mounted on the helmet, the first LIDAR sensor being configured to detect distances between the first LIDAR sensor and surfaces near the helmet;
   a multi-camera system mounted on the helmet;
   a synchronization circuit configured to synchronize outputs of at least the first LIDAR sensor and the multi-camera system;
   a movement sensor mounted on the helmet and configured to detect movement the helmet; and
   an electronic output configured to provide output of the first LIDAR sensor, output of the multi-camera system, and output of the movement sensor, in real-time to a data storage device;
   wherein the multi-camera system is configured to generate angle dependent textures for registration to transparent surfaces.

2. The system of claim 1, wherein the multi-camera system comprises stereoscopic optics.

3. The system of claim 1, further comprising registration logic configured to generate a wireframe representation of the surfaces based on the output of at least the first LIDAR sensor.

4. The system of claim 3, wherein the registration logic is configured to map textures of the surfaces to points on the wireframe.

5. The system of claim 1, further comprising change logic configured to detect changes in an environment detected by the first LIDAR sensor, the changes including positions of surfaces.

6. The system of claim 5 wherein said surfaces include surfaces interior to a building.

7. The system of claim 1, further comprising change logic configured to detect changes in an environment, the changes including opening of a door.

8. The system of claim 1, further comprising mapping logic configured to generate a map of an environment based on outputs of at least the first LIDAR sensor, the map including indications of detected surfaces and indication of areas of the environment that have not been mapped.

9. The system of claim 1, further comprising a second LIDAR sensor.

10. The system of claim 1, wherein the multi-camera system includes a 360 degree camera system.

11. The system of claim 1, wherein the multi-camera system includes at least two cameras.

12. The system of claim 1, further comprising a second LIDAR sensor.

13. The system of claim 1, wherein the multi-camera system includes a 360 degree camera system.

14. The system of claim 1, wherein the multi-camera system includes at least two cameras.

15. A head-mounted sensor system comprising:
   a helmet;
   a first LIDAR sensor mounted on the helmet, the first LIDAR sensor being configured to detect distances between the first LIDAR sensor and surfaces near the helmet;
   a multi-camera system mounted on the helmet;
   a synchronization circuit configured to synchronize outputs of at least the first LIDAR sensor and the multi-camera system;
   a movement sensor mounted on the helmet and configured to detect movement the helmet; and
   an electronic output configured to provide output of the first LIDAR sensor, output of the multi-camera system, and output of the movement sensor, in real-time to a data storage device; and
   difference logic configured to identify a surface as transparent by detecting the surface using an ultrasonic range finder but not detecting the surface using the LIDAR sensor.

16. The system of claim 15 wherein the multi-camera system comprises stereoscopic optics.

17. The system of claim 15 further comprising registration logic configured to generate a wireframe representation of the surfaces based on the output of at least the first LIDAR sensor.

18. The system of claim 17 wherein the registration logic is configured to map textures of the surfaces to points on the wireframe.

19. The system of claim 15 further comprising change logic configured to detect changes in an environment detected by the first LIDAR sensor, the changes including positions of surfaces.

20. The system of claim 19 wherein said surfaces include surfaces interior to a building.

21. The system of claim 15 further comprising change logic configured to detect changes in an environment, the changes including opening of a door.

22. The system of claim 15, further comprising mapping logic configured to generate a map of an environment based on outputs of at least the first LIDAR sensor, the map including indications of detected surfaces and indication of areas of the environment that have not been mapped.

* * * * *